United States Patent
Bloy et al.

(10) Patent No.: US 11,727,356 B2
(45) Date of Patent: Aug. 15, 2023

(54) AUTOMATIC GENERATION AND TRACKING OF ACQUISITION IDS AND PRODUCT SOURCES

(71) Applicant: The Toronto-Dominion Bank, Toronto (CA)

(72) Inventors: Adrian Bloy, Ottawa (CA); Morgan Klein-MacNeil, Toronto (CA)

(73) Assignee: The Toronto-Dominion Bank

( * ) Notice: Subject to any disclaimer, the term of this patent is extended or adjusted under 35 U.S.C. 154(b) by 159 days.

(21) Appl. No.: 17/482,664

(22) Filed: Sep. 23, 2021

(65) Prior Publication Data

US 2022/0012689 A1    Jan. 13, 2022

Related U.S. Application Data

(63) Continuation of application No. 16/748,137, filed on Jan. 21, 2020, now Pat. No. 11,151,513.

(51) Int. Cl.
*G06Q 10/10* (2023.01)
*G06Q 30/0235* (2023.01)
(Continued)

(52) U.S. Cl.
CPC ............ *G06Q 10/10* (2013.01); *G06F 16/22* (2019.01); *G06Q 30/0235* (2013.01); *G06Q 30/0236* (2013.01); *G06Q 30/0283* (2013.01); *G06Q 30/0629* (2013.01); *G06Q 30/0641* (2013.01); *G06Q 40/02* (2013.01); *H04L 63/102* (2013.01);
(Continued)

(58) Field of Classification Search
CPC ............... G06Q 10/10; G06Q 30/0235; G06Q 30/0236; G06Q 30/0283; G06Q 30/0629; G06Q 30/0641; G06Q 40/02; G06F 16/22; H04L 63/102; H04L 67/02; H04L 67/306
See application file for complete search history.

(56) References Cited

U.S. PATENT DOCUMENTS 6,379,506 B1    4/2002    Wilson et al.
8,473,394 B2    6/2013    Marshall
(Continued)

OTHER PUBLICATIONS

Final Office Action issued in U.S. Appl. No. 16/748,322 dated Jan. 27, 2022, 14 pages.
(Continued)

*Primary Examiner* — Scott C Anderson
(74) *Attorney, Agent, or Firm* — Fish & Richardson P.C.

(57) ABSTRACT

The present disclosure involves systems, software, and computer implemented methods for automatically generating acquisition IDs and using them to track and record how products are identified, offered, and sold, as well as how customers respond to particular variations of product offers. The acquisition ID can be associated with any product sale, transaction completion, or account creation initiated using or otherwise identifying or associated with the acquisition ID, where the connection to the acquisition ID can be maintained and retained with ongoing records associated with the interaction and created account, transaction, and/or product purchase. Using the stored information and the acquisition IDs, an organization can precisely determine what products were sold using which marketing tactic, campaign, or channel through which the transaction occurred and/or was initiated, among others.

20 Claims, 5 Drawing Sheets

(51) Int. Cl.

| | |
|---|---|
| *G06Q 30/0207* | (2023.01) |
| *G06Q 40/02* | (2023.01) |
| *G06Q 30/0283* | (2023.01) |
| *G06Q 30/0601* | (2023.01) |
| *G06F 16/22* | (2019.01) |
| *H04L 9/40* | (2022.01) |
| *H04L 67/02* | (2022.01) |
| *H04L 67/306* | (2022.01) |
| *G06Q 30/0211* | (2023.01) |

(52) U.S. Cl.
 CPC ............ *H04L 67/02* (2013.01); *H04L 67/306* (2013.01); *G06Q 30/0211* (2013.01)

(56) References Cited

U.S. PATENT DOCUMENTS

| | | | |
|---|---|---|---|
| 8,533,030 | B1 | 9/2013 | Dhir et al. |
| 8,533,045 | B1 | 9/2013 | Cunningham et al. |
| 8,825,522 | B2 | 9/2014 | Mankoff |
| 9,679,312 | B2 | 6/2017 | Troiano et al. |
| 9,922,338 | B2 | 3/2018 | Ovick et al. |
| 10,007,923 | B1 | 6/2018 | Strock et al. |
| 10,152,759 | B2 | 12/2018 | Lyman et al. |
| 2003/0200201 | A1 | 10/2003 | Milius |
| 2007/0034689 | A1 | 2/2007 | Jaros et al. |
| 2009/0006246 | A1 | 1/2009 | Fallon et al. |
| 2010/0250359 | A1 | 9/2010 | Gillenson et al. |
| 2011/0161159 | A1 | 6/2011 | Tekiela et al. |
| 2011/0276383 | A1 | 11/2011 | Heiser et al. |
| 2012/0042025 | A1 | 2/2012 | Jamison et al. |
| 2013/0238413 | A1 | 9/2013 | Carlson et al. |
| 2013/0262204 | A1 | 10/2013 | Stiles et al. |
| 2014/0006195 | A1 | 1/2014 | Wilson |
| 2014/0278722 | A1 | 9/2014 | Duerr et al. |
| 2015/0262221 | A1 | 9/2015 | Nakano et al. |
| 2016/0086222 | A1 | 3/2016 | Kurapati |
| 2016/0125466 | A1* | 5/2016 | Kulkarni ............ G06F 3/04883 705/14.58 |
| 2016/0171555 | A1 | 6/2016 | Buerger et al. |
| 2016/0189192 | A1 | 6/2016 | Walz |
| 2016/0217454 | A1 | 7/2016 | Killoran, Jr. |
| 2017/0098234 | A1 | 4/2017 | Carlson et al. |
| 2018/0101860 | A1 | 4/2018 | Fleming et al. |
| 2018/0150869 | A1* | 5/2018 | Finnegan ........... G06Q 30/0239 |
| 2018/0225678 | A1 | 8/2018 | Macilwaine et al. |
| 2019/0318373 | A1 | 10/2019 | Wagner |
| 2020/0042968 | A1* | 2/2020 | Jayaram ............. G06Q 30/0207 |
| 2021/0224746 | A1 | 7/2021 | Bloy et al. |
| 2021/0224839 | A1 | 7/2021 | Bloy et al. |
| 2021/0264467 | A1 | 8/2021 | Boal |

OTHER PUBLICATIONS

Hunter, "How We Earn Money From the Blog" Apr. 5, 2018, [retrieved on Jan. 27, 2022], retrieved from : URL <https://millionmilesecrets.com/news/credit-card-affiliate-links/>, 17 pages.

Final Office Action issued in United States U.S. Appl. No. 16/748,322 dated Jun. 30, 2021, 20 pages.

NerdWallet.com [online], "We Cover Your Money Like It's Our Money" available on or before Dec. 2013, via Internet Archive: Wayback Machine URL <https://web.archive.org/web/20131217140600/http://www.nerdwallet.com/about-us>, retrieved on Feb. 25, 2021, URL </http://www.nerdwallet.com/about-us>, 41 pages.

Non-Final Office Action issued in United States U.S. Appl. No. 16/748,137 dated Mar. 30, 2021, 39 pages.

Non-Final Office Action issued in United States U.S. Appl. No. 16/748,322 dated Feb. 25, 2021, 18 pages.

Shui "Time inconsistency in the credit card market." Jan. 30, 2005, 49 pages.

Non-Final Office Action issued in United States U.S. Appl. No. 16/748,322 dated Oct. 5, 2021, 26 pages.

BirchFinance.com [online], "Information on Birch Finance" Jan. 18, 2019, [retrieved on Mar. 25, 2022], retrieved from : URL <https://web.archive.org/web/20190118230029/https://birchfinance.com/, 6 pages.

Medium.com [online], "Building a credit card recommender with Scikit—Learn and deploying on web and chatbot" Dec. 28, 2018 [retrieved on Mar. 24, 2022], retrieved from : URL <https://medium.com/learning-machine-learning/building-a-credit-card-recommender-and-deploying-on-web-and-chatbot-platform-91bd7baf2798>, 9 pages.

Medium.com [online], "Our new credit card recommendation tool changes the game forever" Mar. 9, 2018 [retrieved on Mar. 22, 2022], retrieved from : URL <https://medium.com/@alexcohenbirch/our-new-credit-card-recommendation-tool-changes-the-game-forever-9b9967295202>, 9 pages.

* cited by examiner

AUTOMATIC GENERATION AND TRACKING OF ACQUISITION IDS AND PRODUCT SOURCES

CROSS-REFERENCE TO RELATED PATENT APPLICATIONS

This application is a continuation of and claims the benefit of priority to U.S. patent application Ser. No. 16/748,137, filed Jan. 21, 2020, which is related to U.S. patent application Ser. No. 16/748,322, filed Jan. 21, 2020, the contents of which are incorporated by reference herein.

TECHNICAL FIELD

This disclosure generally relates to computer-implemented methods, software, and systems for automatically generating and tracking acquisition identifications (IDs), and subsequently using the acquisition IDs to track different product offers and their performance.

BACKGROUND

Vendors and merchants routinely use sales and incentives to encourage customers to purchase new products or open new accounts. These sales and incentives are often offered as part of a marketing campaign, and can be limited time offers or have special requirements.

SUMMARY

The present disclosure involves systems, software, and computer implemented methods for automatically generating acquisition IDs and using them to track and record how products are identified, offered, and sold, as well as how customers respond to particular variations of product offers. A first example system includes a communications module, at least one memory storing instructions, a repository storing a plurality of product offers, each product offer associated with at least one acquisition identifier (ID), and a repository storing a plurality of user accounts, each user account associated with a particular customer. The example system further includes at least one hardware processor interoperably coupled with the at least one memory and the communications module. The instructions can cause the hardware processor to perform the following operations, including receiving a navigation request from an entity, the navigation request associated with a universal resource locator (URL), and the URL is associated with one of a plurality of acquisition IDs. The particular acquisition ID associated with the URL corresponds to a set of parameters associated with a first product offer. The system can then perform a validation of the acquisition ID associated with the URL and determine whether the first product offer is valid. If the first product offer is determined to be valid, the system can 1) generate a digital application associated with the product offer for the product, 2) provide the generated application for presentation via a user interface in order to get input from a customer associated with the entity, 3) receive a plurality of inputs associated with the digital application and 4) perform an adjudication process based on the plurality of inputs associated with the digital application. If the adjudication is successful and the digital application is approved, the system can then create a new customer account associated with the customer and store the acquisition ID associated with the first product offer with the created customer account associated with the customer.

Implementations can optionally include one or more of the following features.

In some instances, a successful validation of the acquisition ID indicates that the product associated with the acquisition ID is currently being offered.

In some instances, the stored acquisition ID is one of a plurality of stored acquisition IDs, and the hardware processor further performs analytics on products based on the plurality of stored acquisition IDs.

In some instances, the acquisition ID identifies information associated with the product offer, including 1) a particular product being offered, 2) a platform the product is offered on, and 3) a range of offer validity dates. The acquisition ID can also optionally identify an interest rate associated with the product, an incentive associated with the product, a cost associated with the product, or a marketing category associated with the product offer.

In some instances, validation the acquisition ID includes accessing, via an application programming interface (API), a repository of acquisition IDs, where each acquisition ID is associated with a different product offer, and determining that the product offer associated with the acquisition ID is one of active, expired, or invalid. Optionally, if the first product offer is determined to be expired, a second product offer, selected based on the parameters associated with the first product offer. Offering the second product offer can include querying a repository of active product offers based on the parameters associated with the first offer, receiving search results in response to the query, determining, from the search results, an active product offer that is most similar to the first product offer when compared to the remaining product offers in the search results, and selecting the active product offer as the second offer. Optionally, the query can be further based on customer information.

In some instances, the processor additionally receives the set of parameters associated with the first product offer, generates and stores at least one acquisition ID based on the set of parameters, the acquisition ID uniquely identifying the first product offer. The system can then generate the URL associated with the acquisition ID.

In some instances, the product is a financial product associated with a particular incentive. Optionally, the financial product can be a credit card, and the particular incentive can be any combination of an incentive interest rate, bonus points, or cash-back rewards.

In some instances, the plurality of inputs associated with the digital application are received from any combination of a user interface associated with a client device, or a repository containing information associated with the customer.

A second example system includes a communications module, at least one memory storing instructions, a repository storing a plurality of product offers, each product offer associated with at least one acquisition identifier (ID), and a repository storing a plurality of user accounts, each user account associated with a particular customer. The example system further includes at least one hardware processor interoperably coupled with the at least one memory and the communications module. The instructions can cause the hardware processor to perform the following operations, including receiving customer information associated with a customer from an assisted channel agent system, generating a list of valid product offers based on at least one stored acquisition ID, providing the list of valid product offers for display at the agent system, receiving a selection of a product offer and a digital application for a product associated with the product offer from the agent system, and performing and adjudication process based on the digital application. If the digital application is approved during the adjudication process, the system can then create a new customer account associated with the customer and store the acquisition ID associated with the first product offer with the created customer account associated with the customer.

Implementations can optionally include one or more of the following features.

In some instances, the agent system is operated by an agent, and a valid product offer is an offer available to the customer based on the customer information. In some instances, the product is a financial product associated with a particular incentive. Optionally, the financial product can be a credit card, and the particular incentive can be any combination of an incentive interest rate, bonus points, or cash-back rewards.

In some instances, the list of valid offers is prioritized based on any combination of a profitability determination or a determination of likelihood of success based on the customer information.

In some instance, the list of valid offers includes additional information for each offer identifying the benefits of that particular offer.

In some instances, the stored acquisition ID is one of a plurality of stored acquisition IDs, and the hardware processor further performs analytics on products based on the plurality of stored acquisition IDs.

In some instances, the acquisition ID identifies information associated with the product offer, including 1) a particular product being offered, 2) a platform the product is offered on, and 3) a range of offer validity dates. The acquisition ID can also optionally identify an interest rate associated with the product, an incentive associated with the product, a cost associated with the product, or a marketing category associated with the product offer.

In some instances, the processor additionally receives the set of parameters associated with the first product offer, generates and stores at least one acquisition ID based on the set of parameters, the acquisition ID uniquely identifying the first product offer. The system can then generate the URL associated with the acquisition ID.

Similar operations and processes may be performed in a different system comprising at least one processor and a memory communicatively coupled to the at least one processor where the memory stores instructions that when executed cause the at least one processor to perform the operations. Further, a non-transitory computer-readable medium storing instructions which, when executed, cause at least one processor to perform the operations may also be contemplated. Additionally, similar operations can be associated with or provided as computer-implemented software embodied on tangible, non-transitory media that processes and transforms the respective data; some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Figure 1:
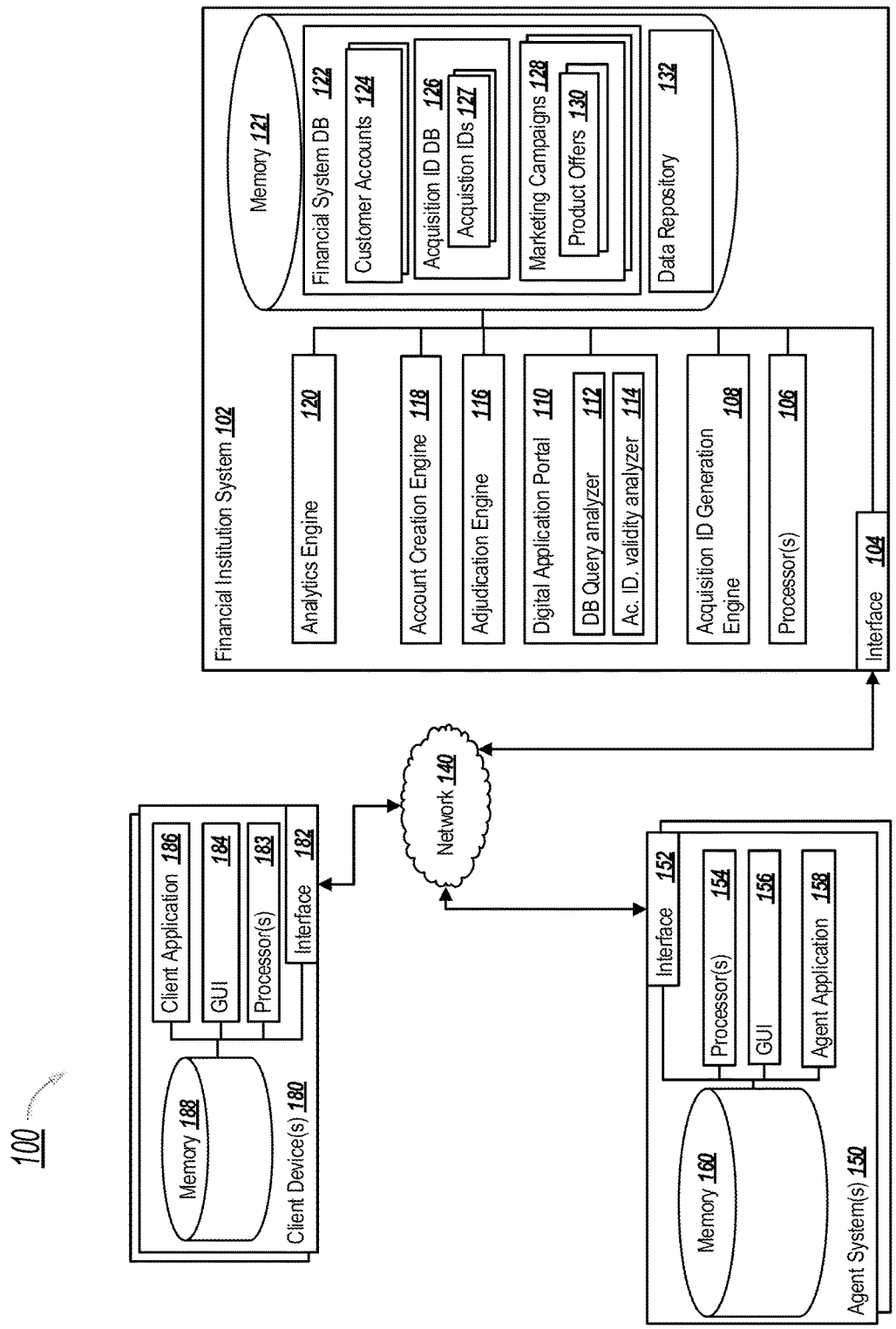
FIG. 1 depicts a block diagram of a system for generating and tracking acquisition identifiers (IDs).

This disclosure describes a system for automatically generating acquisition IDs and using them to track and record how products are identified, offered, and sold, as well as how customers respond to particular variations of product offers. Specifically, when an organization or vendor generates a new marketing campaign or offers a new product, the organization or vendor can offer several versions, options, and/or incentives based on the campaign or associated with the product. The products can include sub-products, and can be offered via multiple unique channels (e.g., television, social media, public advertising, private offers, etc.). A sub-product can be an additional product or option on a product that is related to its parent product. For example, a product may be a cell phone, and its sub-products may include a 32 GB version, 64 GB version, and 128 GB version. Alternatively, the product may be a credit card or credit card type, and its sub-products may be varying levels of the card, such as gold, platinum, and black. Each generated product offer in a campaign can be associated with an acquisition identifier (ID). The acquisition ID can identify or reference the product being offered, as well as one or more of any sub-products associated with an offer, the channel the product is offered through (e.g., website, particular social media site, email campaign), the campaign the offer is a part of (e.g., Fall Discount 2020, etc.), the cost of the product associated with the offer, a start date and/or an end date associated with the offer, and other related information (e.g., an interest rate associated with the offer, a bonus incentive provided with the offer, additional perks or other benefits associated with the offer, a marketing category of the offer, etc.). The acquisition ID can then be associated with any product sale, transaction completion, or account creation initiated using or otherwise identifying or associated with the acquisition ID, where the connection to the acquisition ID can be maintained and retained with ongoing records associated with the interaction and created account, transaction, and/or product purchase. Using the stored information and the acquisition IDs, an organization can precisely determine what products were sold using which marketing tactic, campaign, or channel through which the transaction occurred and/or was initiated, among others. Other analytics and analysis can be performed to obtain relevant product offer information to help evaluate particular campaigns and to shape future marketing and product offers.

For example, an automobile dealership may decide to conduct a spring sale which is valid for the month of April (marketing campaign). During the spring sale, the dealership may offer a $2000 cash incentive with the purchase of any new vehicle or a $500 fuel card incentive with the purchase of any used vehicle (products). Additionally, for qualified buyers, they may offer 0% financing (sub-product), as opposed to the standard 4.9% financing. These offers may be advertised through social media, television commercials, billboards, and newspaper advertisements (channels). In this example, an acquisition ID can be generated for each potential product offer (e.g., a new car is purchased without the 0% financing and the customer was informed via a television commercial, or alternatively, a new car purchased with 0% financing via a social media advertisement, etc.). In another example, a product may be a particular make and model of a vehicle, and each sub-product is a different trim level associated with that vehicle (e.g., a sport trim, club trim, or grand touring trim for a particular model of roadster, etc.). In some instances, acquisition IDs can be uniquely assigned to each different option of the campaign, allowing discrete identification or particular offer features. For example, the same offer made through two different channels (e.g., on Facebook and on Twitter) can have two different acquisition IDs for more granular information. The acquisition ID can then be recorded with the record of sale for each car sold during the marketing campaign. The car dealership can then easily determine which portions of the campaign were most successful, or what product offers were accepted compared to others, based on the stored acquisition IDs.

In another example, a financial institution may offer a New Year bonus program, which is valid starting in January with no end date (campaign). The bonus program may include a 2% cashback credit card, a reward points credit card, and a 30,000 instant point incentive for opening a new account (products). The reward points credit card may have different reward tiers based on customer qualification (sub-products). For example, a product may be a loyalty rewards card, with the sub-products of a rewards card providing 2 points per dollar spent, a rewards card at 3 points per dollar, and a rewards card at 4 points per dollar. Customers may be able to apply for these products via telephone, in person, on a social media website, or at the financial institution's home page (channels). Similar to the previous example, each product and sub-product can be assigned an acquisition ID which uniquely identifies the product, channel, and campaign, and which can be used for both validation and offer of the product, as well as future analytics associated with the campaign in general.

Since the acquisition IDs can indicate which specific channel the product is offered through, or through which a purchase or application associated with the product is received, a uniform resource locator (URL) can be generated, where the URL links to or is associated with a product offer based on the acquisition ID (e.g., https://www.website.com/product?ID=XYZ32, where the acquisition ID is "XYZ32"). In some implementations, there can be a single URL (e.g., https://www.website.com) which is appended with the acquisition ID (e.g., XYZ32) and directs users to a portal for applying for a product based on the appended acquisition ID. For example, if a customer selects a banner ad (which is associated with a particular acquisition ID through that particular ad or channel), that banner ad can be associated with a URL that directs the customer to a self-serve channel where the customer can receive detailed information about the product offer and complete an application for the offer. In some instances, such as where the product is a financial product, the URL can send the customer to a digital application associated with the product and specifically linked to the acquisition ID. Since the acquisition ID is associated with the URL, the organization or vendor hosting or associated with the URL can identify exactly which product offer was selected and verify that the identified offer is valid or still active. The backend application and/or related system can then automatically provide the customer a digital application to be filled out by the customer. Upon receiving the completed digital application, the organization can perform an adjudication based on the received input (e.g., a creditworthiness check to determine if the customer qualifies for the offer if the product is a financial product), and, after approval, create a new account associated with the customer. The new product can then be provided to the customer. In some implementations, a simple customer authorization is performed. For example customer authorization can be conducted based on predetermined logic associated with the application (e.g., if the application satisfies a set of criteria). In yet another implementation, third party authorizations can be conducted. For example, the application may be transmitted to a federal agency which can verify the customer's name against a database and ensure there is no record of criminal activity associated with the customer. In this example, the FI system 330 may receive an approve or disapprove from one or more third parties, and then further determine whether or not to approve or disapprove the application based on the results of the third party authorization(s).

Following acceptance of the product offer, the organization can then store the acquisition ID with the account associated with the customer, or otherwise associate the acquisition ID with the account, and therefore retain a reference of which channel that account was created through, the specific product offer, and the campaign that resulted in creation of the account.

In another implementation, when a customer indicates a desire for a product via an assisted channel, such as a telephone call or in person at a place of business, acquisition IDs can be used to guide the customer to the most suitable product. In this implementation, an agent working in the assisted channel can collect information from a prospective customer and relay that information to backend system associated with a vendor or organization offering products. The agent system can then query a backend database of acquisition IDs, filter product offers that are applicable to the customer based on the collected information, and provide the agent with a prioritized list of potential offers and their associated details. The prioritized list can also include additional details (e.g., incentives, summaries, or marketing strategies) to assist the agent with describing and/or offering a product to the customer. If the customer agrees on a particular product offer, the agent can then complete a digital application for the customer, transmitting the application to the backend system where an account associated with the customer can be created. The customer can be provided with the selected product (or, alternatively, information can be provided to the agent so the agent can provide the customer with the product), and the acquisition ID associated with the particular product offer can be stored with the newly created customer account for future analytics.

In some implementations, each individual product has an associated acquisition ID which identifies not only the product, but the marketing campaign and the channel through which the product was offered. Each account that is created can contain basic demographic information of the corresponding customer, as well as more detailed personal information about the customer. Therefore, simply storing the acquisition ID with each newly created account can allow a vendor or organization (e.g., financial institution) to track and analyze, with a high level of granularity, the sources of all successful product offers. This data can allow the organization to perform future analytics to determine the effectiveness of various marketing campaigns, or which campaigns achieve the most success with a particular demographic or customer base. Additionally, by storing this information, long term analysis can yield valuable information related to how consumers apply for products.

Turning to the illustrated example implementation, FIG. 1 is a block diagram illustrating an example system 100 for generating and tracking acquisition IDs 127. Specifically the illustrated system 100 is a system for generating acquisition IDs 127 associated with a marketing campaign, product offer, and channel, using the acquisition IDs 127 to offer products, and tracking the source of successful account creation. The system 100 includes a financial institution (FI) system 102, one or more agent systems 150, and one or more client devices 180. It is noted that the FI system 102 is used as an example, and that any type of backend system can be used where accounts are created or associated with acquisition IDs 127. For example, a merchant backend may be used, and new applications submitted due to particular deals or discounts can be associated with the acquisition IDs 127 corresponding to the applied and selected deals or discounts, allowing for similar operations as described herein.

The FI system 102 provides a backend system associated with a financial institution used to manage one or more accounts and financial services and to generate and execute one or more campaigns associated with selling products. As illustrated, the FI system 102 includes an acquisition ID generation engine 114, an account creation engine 116, an adjudication engine 118, a digital application portal 110, an analytics engine 120, one or more processors 106, and a memory 121. The acquisition ID generation engine 108 can access a FI system database 122 and pull information from one or more product offers 130 to generate a unique acquisition ID for each product offer 130.

The interface 104 is used by the FI system 102 for communicating with other systems in a distributed environment, including within the system 100, connected to the network 140, e.g., agent system 150, and other systems communicably coupled to the illustrated FI system 102 and/or network 140. Generally, the interface 104 comprises logic encoded in software and/or hardware in a suitable combination and operable to communicate with the network 140 and other components. More specifically, the interface 104 can comprise software supporting one or more communication protocols associated with communications such that the network 140 and/or interface's 104 hardware is operable to communicate physical signals within and outside of the illustrated system 100. Still further, the interface 104 can allow the FI system 102 to communicate with the agent system 150 and/or other portions illustrated within the FI system 102 to perform the operations described herein.

The acquisition ID generation engine 108, in response to a new product offer 130 and/or a new marketing campaign, can assign an acquisition ID 127 to each product offer 130 and store the acquisition ID 127 in an acquisition ID database 126, along with information relating to the associated product offer 130, marketing campaign 128, and particular channel in which the product offer 130 will be presented. In some instances, the acquisition ID 127 may be a five digit alphanumeric code (e.g., 7S6n1) that references a particular entry within a table in the acquisition ID database 126, where the particular entry indicates a specific product that will be offered via a particular channel and under a specific marketing campaign 128. The table can also indicate additional parameters, such as dates and product details, associated with the product. For example, a date range for which the product offer is valid or a tier level at which the product is offered (e.g., only available to platinum rewards members) can be defined within a relevant parameter or set of parameters. In another example, the table can include the product details, such as interest rates, bonus point rates, or other incentives associated with the product offer 130. The acquisition ID generation engine 108 can automatically update and maintain the acquisition ID database 126 as modifications are made to the availability or active status of different product offers 130. For example, the acquisition ID generation engine 108 can identify when one or more product offers 130 expire and, upon expiration, can update the associated acquisition IDs 127 in the acquisition ID database 126 from an active status to an inactive or expired status. In some instances, the acquisition ID generation engine 108 can generate a URL associated with each of the acquisition IDs 127. The URL can then be provided as a hyperlink embedded within or associated with advertisements or other marketing presentations, where customers can interact with the advertisement or navigate to a particular URL to access a particular product based on the associated product offer 130. For example, upon selection of a URL associated with a particular product offer 130, the customer, interacting with the URL using a digital application portal 110 executing on client device 180, can be directed or navigated to a website or application at which more information can be obtained and from which the product can be purchased and/or applied for. In some instances, information associated with the particular product can be preloaded into an application associated with the product offer associated with the URL, as well as some other additional information associated with the acquisition ID 127 (e.g., channel, marketing campaign, date range, as described above). In some instances, customer-specific information, such as that available at the client device 180 and/or stored at the FI system 102, can be added to the digital application and used as part of the application process.

The FI system 102 includes one or more processors 106. Although illustrated as a single processor 106 in FIG. 1, multiple processors can be used according to particular needs, desires, or particular implementations of the system 100. Each processor 106 can be a central processing unit (CPU), an application specific integrated circuit (ASIC), a field-programmable gate array (FPGA), or another suitable component. Generally, the processor 106 executes instructions and manipulates data to perform the operations of the FI system 102. Specifically, the processor 106 executes the algorithms and operations described in the illustrated figures, as well as the various software modules and functionality, including the functionality for sending communications to and receiving transmissions from network 140, as well as to other devices and systems. Each processor 106 can have a single or multiple core, with each core available to host and execute an individual processing thread. Further, the number of, types of, and particular processors 106 used to execute the operations described herein can be dynamically determined based on a number of requests, interactions, and operations associated with the FI system 102.

Regardless of the particular implementation, "software" includes computer-readable instructions, firmware, wired and/or programmed hardware, or any combination thereof on a tangible medium (transitory or non-transitory, as appropriate) operable when executed to perform at least the processes and operations described herein. In fact, each software component can be fully or partially written or described in any appropriate computer language including C, C++, JavaScript, Java™, Visual Basic, assembler, Perl®, any suitable version of 4GL, as well as others.

The digital application portal 110 may be a web page, web-based application, application programming interface (API), or other software or component provided by, or associated with the FI system 102, and can present or include an interactive website, form, or other interactive component at which information associated with a product offer and application can be viewed and submitted. The digital application portal 110 may receive inputs from a front-end application such as the client application 186 executing on a client device 180 and can provide the received information to one or more backend systems, such as the account creation engine 116 and the adjudication engine 118. The digital application portal 110 may be accessed by a customer using a client device 180 via the network 140. In some instances, the digital application portal 110 may be dedicated to receiving digital applications, while in others, the digital application portal 110 may provide additional functionality, including account review, financial investment and money transfer functionality, and other available operations and actions associated with the FI system 102. In response to a customer selecting a URL associated with a particular acquisition ID 127, the user can be directed to a page in the digital application portal 110 that has a digital application for the particular product offer. The digital application portal 110 can use a database query analyzer 112 that can query the acquisition ID database 126 and determine if the URL contains a valid acquisition ID 127. If the URL contains an acquisition ID 127 that does not exist, an error message can be returned to the customer. If the URL contains an expired or inactive acquisition ID 127, the digital application portal 110 can use an acquisition ID analyzer 114 to perform a query of the acquisition ID database 126 for active product offers that are similar to the expired or inactive product offer and present the customer with the similar product offer. For example, if a customer clicks on a link (URL) directed to a holiday special that was a cashback offer but the offer has currently expired because the link is old, the digital application portal 110 can query the acquisition ID database 126 for all active cashback offers and present one or more of them to the customer. If the customer agrees to apply for a product, the digital application portal 110 can generate a digital application for the customer to fill out. Upon completion of the digital application, the digital application portal 110 can send the digital application to an adjudication engine 118 for approval.

The adjudication engine 118 can, in some implementations, perform a creditworthiness analysis based on one or more credit rules defined by the financial institution, which can be used to determine whether the digital application is to be accepted or rejected, as well as an amount associated with the acceptance, where appropriate. The adjudication engine 118 can access one or more databases and credit bureaus when making its determination, and, in some cases, can provide an instantaneous or near-instantaneous decision regarding the digital application. In response to approving the digital application, the adjudication engine 118 can use an account creation engine 116 to create a new customer account 124 for the customer who was approved during the adjudication process. The adjudication engine 118 may be part of or associated with a master account management system, and can perform credit provisioning and management within the FI system 102. In some instances, the adjudication engine 118, or a portion thereof, may be a credit management system offered by TSYS or another vendor.

The account creation engine 116 generates the new customer account 124, and associates the customer account 124 with the customer as well as with some or all of the information associated with the customer received from the digital application. This information can be stored in the account data with the acquisition ID 127 associated with the product that was applied for. The account creation engine 116 can also store information associated with the customer, the customer account 124, and the acquisition ID 127 associated with the product offer 130 in a data repository 132, where it can be stored for reference and used for future analytics.

In some implementations, once a new customer account 124 is created and the acquisition ID 127 is associated with the new customer account 124, the digital application portal 110 can provide the customer with the product. In one implementation, the product is a credit account, or other financial account, and the digital application portal 110 provides a credit number or digital credit card. In another implementation, the digital application portal 110 can notify the customer that their product has been shipped, or that their account has been created successfully, and can provide further instructions on how to receive or use the product they have purchased.

An analytics engine 120 can access the acquisition ID database 126, the customer accounts 124, and the data repository 132 to perform analytics on past and present marketing strategies. For example, the analytics engine can use a machine learning process to determine optimal campaigns based on past marketing strategies (e.g., cashback offers are more successful in spring, whereas bonus points offers perform better during the fall, etc.). The analytics engine 120 has access to historical data with a high level of detail. Since each customer account can be stored with the acquisition ID that was used in opening the account, the successful marketing campaign and particular offer (including channel the offer was made through) can be determined for each account. The determined information can then be used on a broad scale, considering many customer accounts, in order to derive insights and improve future marketing campaigns.

In some instances, portions of the interactions and FI system's 102 data can be stored remotely within memory 121. As illustrated, memory 121 can store information related to instructions for operating various applications (e.g., acquisition ID generation engine 108 or analytics engine 120) or other information associated with operation of the FI system 102. In some instances, additional information from either the data repository 132 and/or the financial system database 122 associated with the corresponding customer accounts 124 can be stored locally at memory 121 for use by the digital application portal 110. Memory 121 of the FI system 102 can represent a single memory or multiple memories. The memory 121 can include any memory or database module and can take the form of volatile or non-volatile memory including, without limitation, magnetic media, optical media, random access memory (RAM), read-only memory (ROM), removable media, or any other suitable local or remote memory component. The memory 121 can store various objects or data, including financial data, user and/or account information, administrative settings, password information, caches, applications, backup data, repositories storing business and/or dynamic information, and any other appropriate information associated with the FI system 102, including any parameters, variables, algorithms, instructions, rules, constraints, or references thereto. Additionally, the memory 121 can store any other appropriate data, such as VPN applications, firmware logs and policies, firewall policies, a security or access log, print or other reporting files, as well as others.

While illustrated within the FI system 102, memory 121, or any portion thereof, including some or all of the particular illustrated components, can be located remotely from the FI system 102 in some instances, including as a cloud application or repository or as a separate cloud application or repository when the FI system 102 itself is a cloud-based system. In some instances, some or all of memory 121 can be located in, associated with, or available through one or more other financial systems of the associated financial institution. In those examples, the data stored in memory 121 can be accessible, for example, via one of the described applications or systems. As illustrated and previously described, memory 121 includes the financial system database 122 associated with customer accounts 124, the acquisition ID database 126, marketing campaigns 128, and the data repository 132, among others.

Network 140 facilitates wireless or wireline communications between the components of the system 100 (e.g., between the FI system 102, the agent system 150, client device 180, etc.), as well as with any other local or remote computers, such as additional mobile devices, clients, servers, or other devices communicably coupled to network 140, including those not illustrated in FIG. 1. In the illustrated environment, the network 140 is depicted as a single network, but can comprise more than one network without departing from the scope of this disclosure, so long as at least a portion of the network 140 can facilitate communications between senders and recipients. In some instances, one or more of the illustrated components (e.g., the acquisition ID generation engine 108, the adjudication engine 116, etc.) can be included within or deployed to network 140 or a portion thereof as one or more cloud-based services or operations. The network 140 can be all or a portion of an enterprise or secured network, while in another instance, at least a portion of the network 140 can represent a connection to the Internet. In some instances, a portion of the network 140 can be a virtual private network (VPN). Further, all or a portion of the network 140 can comprise either a wireline or wireless link. Example wireless links can include 802.11a/b/g/n/ac, 802.20, WiMax, LTE, and/or any other appropriate wireless link. In other words, the network 140 encompasses any internal or external network, networks, sub-network, or combination thereof operable to facilitate communications between various computing components inside and outside the illustrated system 100. The network 140 can communicate, for example, Internet Protocol (IP) packets, Frame Relay frames, Asynchronous Transfer Mode (ATM) cells, voice, video, data, and other suitable information between network addresses. The network 140 can also include one or more local area networks (LANs), radio access networks (RANs), metropolitan area networks (MANs), wide area networks (WANs), all or a portion of the Internet, and/or any other communication system or systems at one or more locations.

In some implementations, a customer can interact with the FI system 102 via a client device 180. In these implementations, known as self-serve implementations, the customer is able to review product offers, select one, complete a digital application for, and receive approval for a product offer automatically and without the assistance of a human agent. The client device 180 can include an interface 182, one or more processors 183, a graphical user interface (GUI) 184, a client application 186, and a memory 188.

The interface 182 can be similar to, or different from interface 104, and generally includes logic encoded in software and/or hardware in a suitable combination and operable to communicate with the network 140 and other components. The processor(s) 183 can be similar to, or different from processor(s) 106, and generally executes instructions and manipulates data to perform the operations of the client device 180. Specifically, the processor 183 executes the algorithms and operations described in the illustrated figures, as well as the various software modules and functionality, including the functionality for sending communications to and receiving transmissions from network 140, as well as to other devices and systems. Memory 188 can be similar to, or different from memory 121, and generally stores various objects or data, including financial data, user and/or account information, administrative settings, password information, caches, applications, backup data, repositories storing business and/or dynamic information, and any other appropriate information associated with the client device 180, including any parameters, variables, algorithms, instructions, rules, constraints, or references thereto.

GUI 184 of the client device 180 interfaces with at least a portion of the system 100 for any suitable purpose, including generating a visual representation of any particular digital application portal 110 and/or the content associated with any components of the client device 180 or FI system 102. In particular, the GUI 184 can be used to present results of a digital application, including providing one or more offers to the customer at via the client application 186 and the digital application portal 110, as well as to otherwise interact and present information associated with one or more applications. GUI 184 can also be used to view and interact with various web pages, applications, and web services located local or external to the client device 180. Generally, the GUI 184 provides the user with an efficient and user-friendly presentation of data provided by or communicated within the system. The GUI 184 can comprise a plurality of customizable frames or views having interactive fields, pull-down lists, and buttons operated by the user. In general, the GUI 184 is often configurable, supports a combination of tables and graphs (bar, line, pie, status dials, etc.), and is able to build real-time portals, application windows, and presentations. Therefore, the GUI 184 contemplates any suitable graphical user interface, such as a combination of a generic web browser, a web-enable application, intelligent engine, and command line interface (CLI) that processes information in the platform and efficiently presents the results to the user visually.

Client application 186 can be a web browser or dedicated application associated with the digital application portal 110, or other software or component, and can present or include an interactive website, form, or other interactive component at which information associated with a product offer or digital application can be submitted. The client application 186 may be a front-end used to provide input to or otherwise interface with the digital application portal 110. The client application 186 can provide inputted information to one or more backend systems, such as the FI system 102. In some instances, the client application 186 may be dedicated to receiving product applications, while in others, the client application 186 may provide additional functionality, including account review, financial investment and money transfer functionality, and other available operations and actions associated with the FI system 102. In some implementations, the client application 186 provides a customer with the ability to access and interact with multiple product offers or links via each product offer's URL. In response to a customer selecting a particular URL, the client application 186 can access the digital application portal 110 and provide the customer (via the GUI 184) with the prompts used to complete a transaction.

In some implementations, customers can interact with the FI system 102 via a human agent operating an agent system 150. In these implementations, known as assisted channel implementations, the agent system 150 assists an agent (e.g., a teller or customer service representative) in providing the customer with available product offers. The agent system 150 has an interface 152, which can be similar to or different from interface 104. A memory 160, one or more processors 154, and GUI 156 can also be a part of the agent system 150, and can be similar to or different from each of memory 121, processors 106, and the GUI 184 of the FI system 102 respectively. The agent operating the agent system 150 has access to the agent application 158.

The agent application 158 can access the acquisition ID database 126, the marketing campaigns 128, and product offers 130 of the FI system database 122. If a customer indicates interest in a specific product, or type of product, an agent using the agent application 158 can collect information from the customer. The agent application 158 can use the information to query the FI system database 122 and provide a list of acquisition IDs 127 that are in an active state and applicable to the customer. In some implementations the agent application 158 is able to sort, or prioritize, the product offers 130 based on criteria input from the agent or customer. For example, if a customer expresses a desire for a low interest rate credit product, the agent application 158 can query the FI system database 122 and return all valid credit products, sorted by interest rate from low to high. The agent can then view this information in the agent application 158 via the GUI 156 and provide applicable information and a recommendation to the customer.

In these assisted channel implementations, if the customer agrees to apply for a product, the agent can use the agent application 158 to complete a digital application which the agent system 150 can transmit to FI system 102 for processing by the adjudication engine 118 and the account creation engine 116. Similar to with the digital application portal 110, if a new account is created for a product, the acquisition ID 127 for that particular product is stored with the customer account 124 in the FI system database 122, as well as in the data repository 132.

While portions of the elements illustrated in FIG. 1 are shown as individual modules that implement the various features and functionality through various objects, methods, or other processes, the software can instead include a number of sub-modules, third-party services, components, libraries, and such, as appropriate. Conversely, the features and functionality of various components can be combined into single components as appropriate.

Figure 2:
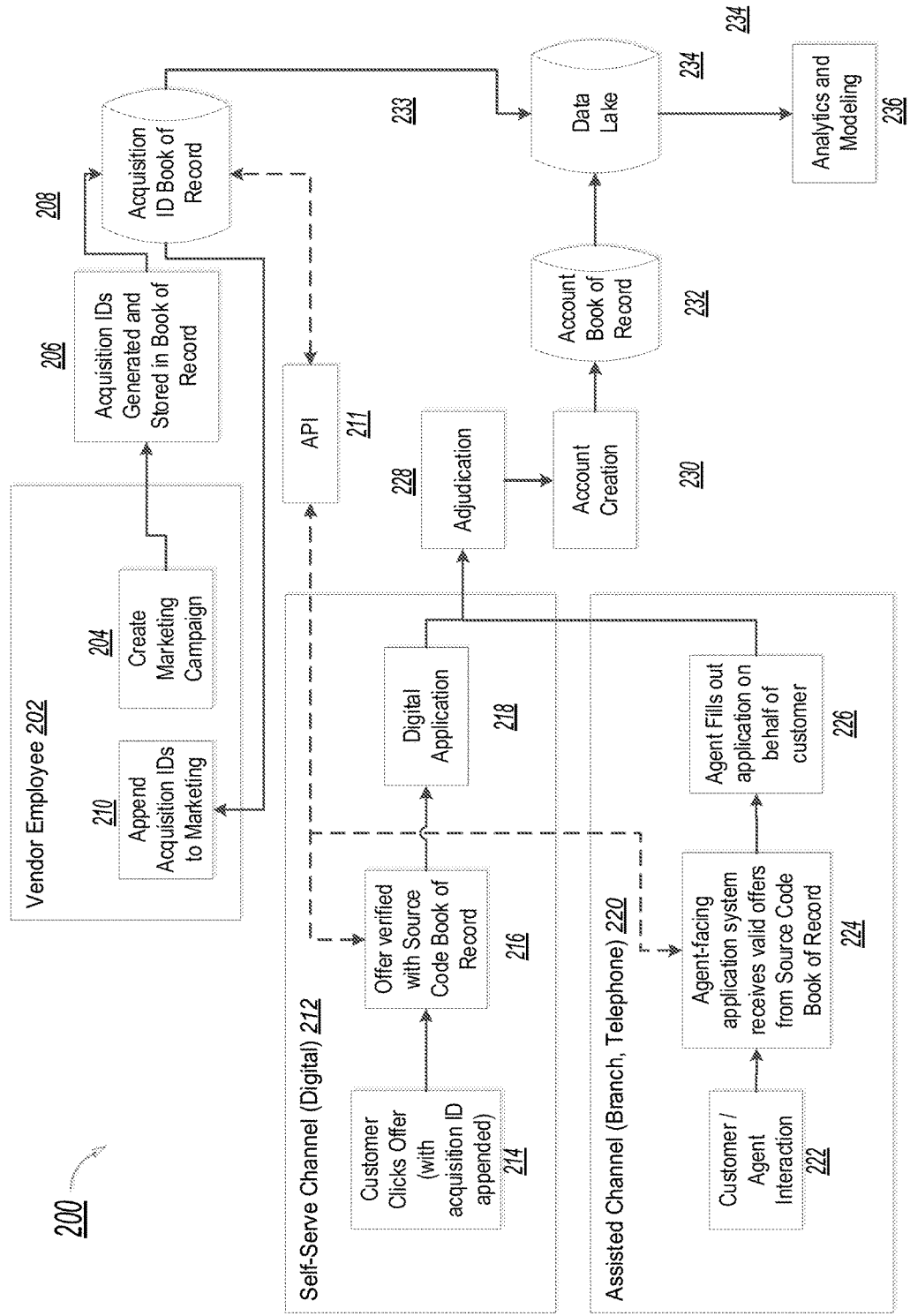
FIG. 2 is a high level overview of a system for generating and tracking acquisition IDs.

FIG. 2 is a high level overview of a system for generating and tracking acquisition IDs. FIG. 2 depicts an example implementation that includes a vender employee 202, a self-serve channel 212, and an assisted channel 220.

The vendor employee 202 can create a marking campaign at 204, which can be used to sell products and gain new customers. The marking campaign can include numerous possible product offers, and a FI system (not shown), for example, the FI system 102 as described in FIG. 1 can generate an acquisition ID for each product offer at 206. The acquisition IDs can be stored in a book of record at 208, which can be a memory or other suitable recording medium that can be accessed for future reference. The acquisition ID book of record can be, for example, the acquisition ID database 126 illustrated in FIG. 1.

The acquisition ID book of record can maintain a registry of all active or valid acquisition IDs, and thus all active or valid product offers. Additionally the acquisition ID book of record can be accessible via an API, such that external applications or entities can access the data and query the acquisition ID book of record. In some implementations the acquisition ID book of record maintains additional data in separate repository, or data lake. For example, the acquisition book of record can maintain active acquisition IDs, and when they expire or become inactive, at 233, the acquisition ID book of record can pass the expired or inactive acquisition IDs to the data lake for long term storage and future analytics.

Marketing sources can then use the acquisition IDs in online or live marketing as necessary at 210. For example, when creating an advertisement, the acquisition ID can be appended to a URL that a user is directed to upon clicking or selecting the advertisement. In this manner, it can be readily recorded from which source (e.g., channel) a particular product offer was selected.

The self-serve or digital channel 212 can be, for example, a website, or kiosk, or other portal in which a customer can access product offers. When a customer clicks, or otherwise selects, at 214, a product offer with the acquisition ID appended, they can be directed to a web page associated with the vendor, which can then verify the offer they've selected is still valid at 211 with the acquisition ID book of record via an API. In some implementations the API that can be used as an entry point or interface to allow authorized partner systems (e.g., a marketing website) to verify that an acquisition ID associated with a product offer is still valid and stored within the acquisition ID book of record. Upon verification that the product offer is valid, at 218, a digital application can be provided for the customer to fill out.

The assisted channel 220 can be, for example, a customer service desk, or telephone call center. A customer interacts with an agent of the vendor (e.g., a teller at a bank, or a salesman at a car dealership, etc.) In these implementations, the agent can have access to an agent-facing application (e.g., the agent application 158 of FIG. 1) which can query the acquisition ID book of record at 208, via the API (211), which can be separate from or the same as the API associated with the self-serve channel 212. The query can return a list of available offers from the acquisition ID book of record. The agent-facing application can present the list to the agent, who can analyze the presented information and relay applicable information to the customer.

If the customer decides to apply for a product from the list, the agent can fill out a digital application on behalf of the customer at 226. This digital application can be similar to the digital application presented in the self-serve channel at 218. Both the assisted branch application at 226, and the self-serve channel application at 218 may require detailed information about the customer such as current address, previous addresses, income information, social security information, spouse or dependent information, bank account information, or other necessary details for opening an account in the customer's name. Once the digital application is complete (either via the self-serve channel or the assisted channel) an adjudication process is started at 228.

The adjudication process is initiated to determine whether or not the customer meets requirements associated with the product offer. The adjudication process can be a creditworthiness analysis based on one or more credit rules defined by the financial institution, which can be used to determine whether the digital application is to be accepted or rejected, as well as an amount associated with the acceptance, where appropriate. The adjudication inputs can be taken from one or more databases and credit bureaus as well as the digital application when making a determination, and, in some cases, can provide an instantaneous or near-instantaneous decision regarding the digital application. In another implementation, the customer authorization can be conducted based on predetermined logic associated with the digital application (e.g., whether the application satisfies a set of criteria). In yet another implementation, third party authorizations can be conducted. For example, the digital application may be transmitted to a federal agency which can verify the customer's name against a database and ensure there is no record of criminal activity associated with the customer. In this example, the FI system 330 may receive an approval or disapproval from one or more third parties, and can then further determine whether or not to approve or disapprove the digital application based at least in part on the results of the third party authorization(s).

After approval of the digital application, at 230, a new account is created for the customer. The new customer account can include a unique identifier or account number as well as some or all of the information associated with the customer received from the digital application, which can be stored in the account book of record with the acquisition ID associated with the product that was applied for at 232. The new customer account and acquisition ID can also be stored in the data lake at 234 for future access and analysis.

At 236, analytics and modeling is performed on data stored in the data lake. For example, a machine learning process can determine optimal campaigns based on past marketing strategies (e.g., cashback offers are more successful in spring, whereas bonus points offers perform better during the fall, etc.). The data lake contains historical data with a high level of detail. Since each customer account can be stored with the acquisition ID that was used in opening the account, the successful marketing campaign and particular offer (including channel the offer was made through) can be determined for each account. The determined information can then be used on a broad scale, considering many customer accounts, in order to derive insights and improve future marketing campaigns.

Figure 3:
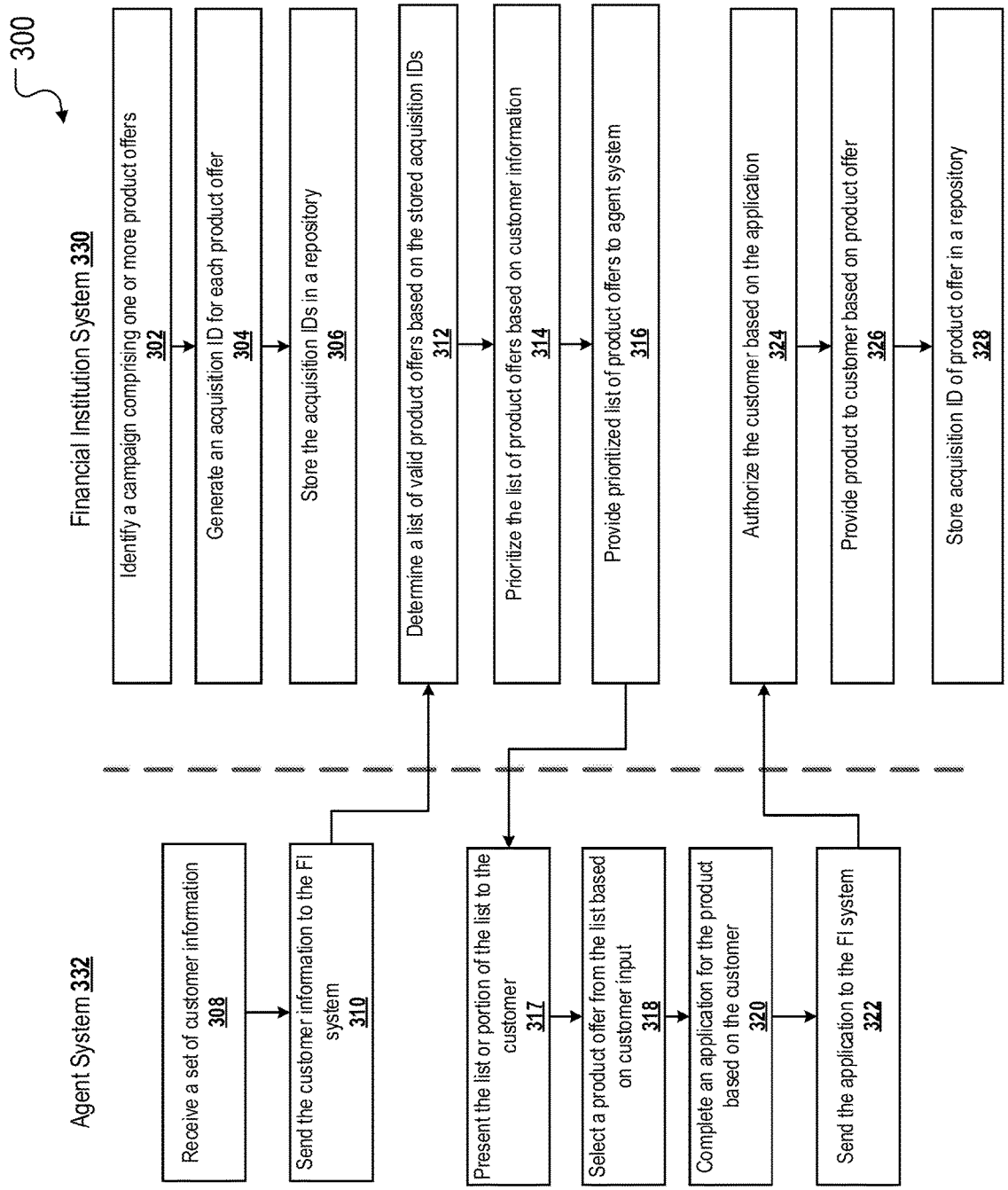
FIG. 3 is a swim-lane diagram describing an example method for tracking product offers and their performance in an assisted channel.

FIG. 3 is a swim lane diagram depicting an example method 300 for tracking product offers and completed offers in an assisted channel. FIG. 3 is illustrated from the points of view of an FI system 330 and an agent system 332 associated with an agent assisting a customer. It will be understood that method 300 may be performed, for example, by any suitable system, environment, software and hardware, or a combination of systems, environments, software and hardware as appropriate. In some instances, method 300 can be performed by the FI system 102, and agent system 150, or portions thereof, described in FIG. 1, as well as other components of functionality described in other portions of this description.

Operations 302 through 306 describe a method of generating new acquisition IDs based on new product offers or marketing campaigns. At 302, a user or administrator of the FI system 330 can identify and/or define a marketing campaign corresponding to one or more product offers associated with the campaign. For example, the user may identify a "Black Friday campaign" which offers a 5% cashback incentive for the first 6 months on all new accounts opened, and is valid from Friday, November 27 to Monday, November 30. Products may be offered via multiple assisted channels (e.g., telephone, brick and mortar store, online chat, etc.) and/or non-assisted channels (e.g., social media links, institution homepage, etc.).

At 304, a unique acquisition ID is generated for each product and channel combination in the marketing campaign. The acquisition ID can be unique for each product being offered, as well as any sub-products (e.g., a 2% cashback card, a 3% cashback card, etc.), the channel the product is offered through, the campaign the offer is a part of, the cost of the offer, a start and/or end date associated with the offer, and other related information (e.g., an interest rate, a bonus incentive, a marketing category, etc.).

At 306, the acquisition ID for each product offer is stored in a repository. For example, the acquisition ID may be a five digit alphanumeric code that references a particular entry within a table in the repository, where the particular entry indicates a specific product that will be offered via a particular channel and under a specific marketing campaign. The table can also indicate additional parameters such as dates and product details, associated with the product. For example, a date range for which the product offer is valid or a tier level at which the product is offered (e.g., only available to platinum rewards members) can be defined within a relevant parameter or set of parameters. In another example, the table can include the product details such as interest rates, bonus point rates, or other incentives associated with the product offer.

Operations 308 through 328 describe a method for using acquisition IDs to track product offers and account creation. At 308, agent system 332 receives a set of customer information. In some implementations, the customer information is simply a name and product of interest. In other implementations, the customer information can also include address or a partial or complete social security number, as well as other identification information. The customer information can additionally include details regarding a particular product, or type of product, the customer is interested in as well as a benefit or incentive the customer desires. For example, if the product is a financial product, the customer information can include an indication that the customer desires a particular financial incentive (e.g., 0% interest rate, sign-on bonus, bonus travel points, etc.). The agent can collect the customer information from the customer verbally, by accessing information via the agent system 332 associated with one or more accounts, or by any other method, and can then send the collected information to the FI system at 310.

At 312, the FI system 330 analyzes the customer information and determines a list of valid product offers based on the active acquisition ID's stored in the repository. In some implementations, the list of product offers contains only product offers that are currently being offered and are applicable to the customer based on the provided customer information. For example, a first customer may qualify for a first tier of products based on a creditworthiness check or previous transactions, while a second customer, who is a return customer and has been determined to be a trusted customer, may qualify for a second (relatively higher) tier of products which offer better incentives. In this example, the FI system 330 can determine a different list of products for the second customer, when compared to the first customer. The FI system 330 can determine the list of products by querying the repository of acquisition IDs and finding products that are satisfied by a set of parameters associated with the customer information.

At 314, the list of product offers can be prioritized by the FI system 330. For example, the FI system 330 may conduct a profitability analysis on each offer and prioritize offers with a relatively higher profitability. In another example, an expected success rate, such as a conversion rate, or related metrics can be determined based on previously conducted market analytics (for example, as described above with reference to the analytics engine 120), and the list can be prioritized based on the expected success rate. The prioritized list can also include additional information to assist the agent. For example, there can be details presented about each product indicating the products' incentives (e.g., limited time offers, comparison to standard or regular rates, specific benefits matching those identified in the customer information, etc.). The prioritized list can be provided back to the agent system 332 and can be displayed to the agent at 316.

At 317, the agent can present the list, or some of the list, to the customer. The list or a portion of the list can be present on a display device, or relayed to the customer verbally by the agent. In another implementation, the list (or portion thereof) can be relayed to the customer, for example, via email or regular mail.

At 318, the customer can select a product to apply for from the provided list. Upon the customer agreeing to apply for a product from the list, the agent system 332 can identify any additional information required to complete the transaction and generate a digital application for the product.

At 320, the agent completes the digital application on behalf of the customer, allowing the customer to apply for a product without filling out an application. In some implementations, the customer can digitally review and sign the application when it is complete. In other implementations, a verbal acknowledgement (e.g., via telephone) can be sufficient to complete the application.

At 322, the agent system 332 can send the completed application to the FI system 330. The application can be sent via a secure communications link.

At 324, the FI system 330 can authorize the customer based on the completed digital application. In some implementations, the authorization of the customer can include an adjudication process conducted on the digital application. The adjudication processes can include a creditworthiness analysis based on one or more credit rules defined by the financial institution, which can be used to determine whether the digital application is to be accepted or rejected, as well as an amount associated with the acceptance, where appropriate. The adjudication can involve one or more databases and credit bureaus when making its determination, and, in some cases, can provide an instantaneous or near-instantaneous decision regarding the digital application. As described with reference to operation 228 of FIG. 2, the authorization can be conducted in various different manners.

At 326, in response to approval of the digital application by the FI system 330, the product can be provided to the customer based on the product offer. For example, if the customer opened a new credit account, an account can be generated for the customer, and the customer can be provided with an account number or other information necessary to access and use the account. In some implementations, the FI system 330 can transmit an authorization to the agent system 332 to inform the agent that they may provide the product to the customer, or that the product offer has been completed and the product has been redeemed by the customer.

At 328, upon a successful creation of an account and completion of the product offer, the FI system 330 stores the acquisition ID of the product offer than was accepted with an account associated with the customer in a repository (similar to or different than the repository described with reference to 306) for future reference and analytics.

Figure 4:
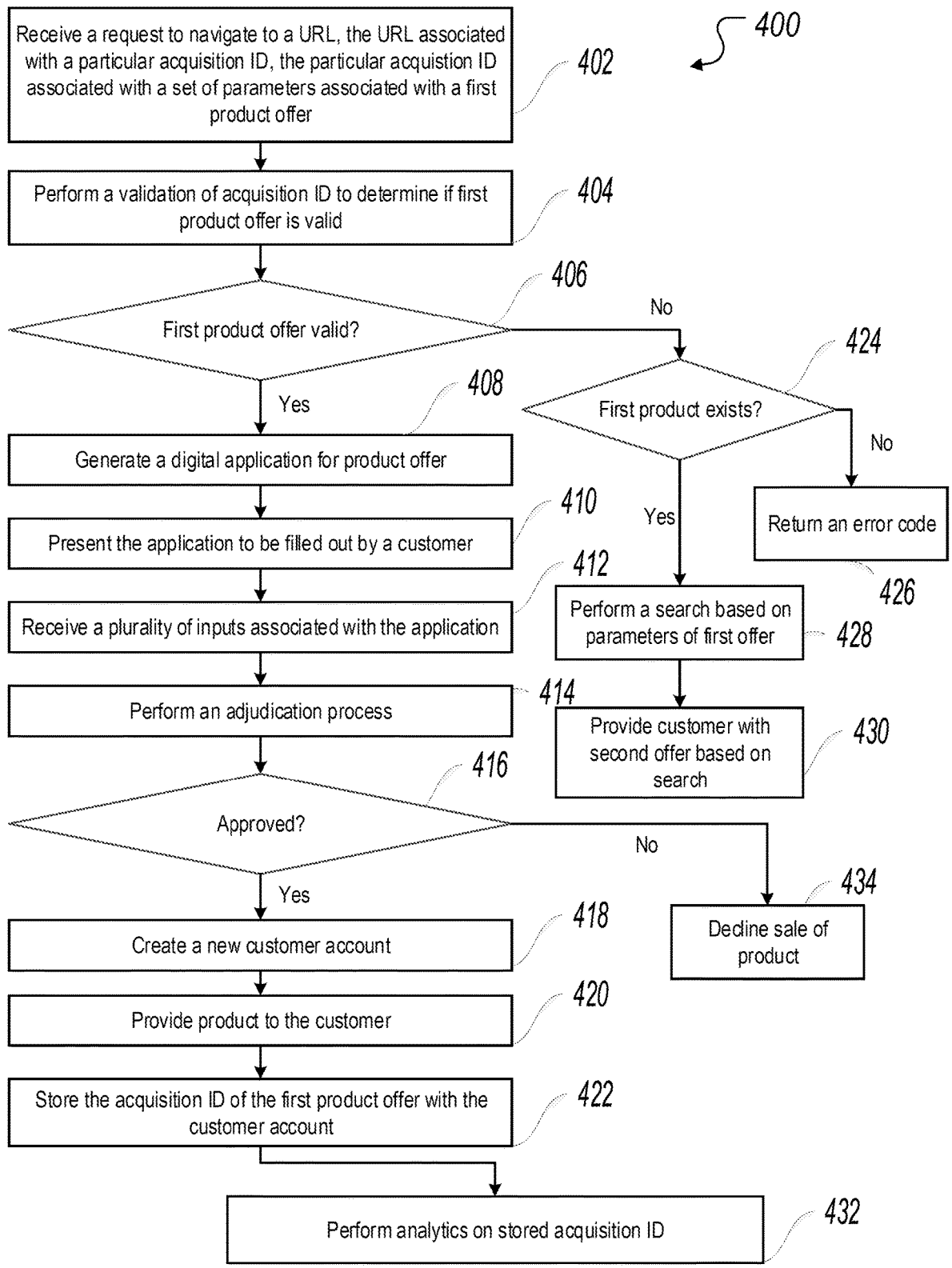
FIG. 4 is flowchart describing an example method for tracking product offers and their performance in a self-serve channel.

FIG. 4 is a flow diagram of an example method 400 for tracking product offers in a self-serve channel. In particular, FIG. 4 is an example illustrated from the point of view of an FI system, such as FI system 102 of FIG. 1. However, it will be understood that method 400 may be performed, for example, by any other suitable system, environment, software, and hardware, or a combination thereof, as appropriate. In some instances, method 400 may be performed by a plurality of connected components or systems. Any suitable system(s), architecture(s), or application(s) can be used to perform the illustrated operations.

At 402, the system receives a request for navigation from a client application, browser, or other software associated with a URL associated with a particular acquisition ID. The acquisition ID may be included in the URL as a parameter, such as after a proper delimiter, such as "?". As previously described, the acquisition ID may be associated with a first product offer being currently offered via a particular channel, or that was previously offered. In some instances, the acquisition ID may be a made up or spoofed value, which may not be valid. The acquisition ID is also associated with, and can provide a reference to, a set of parameters detailing the product offer and an associated set of information about the particular product offer. For example, the acquisition ID may be a five digit alphanumeric code that refers to an entry within a corresponding table in a repository which indicates a specific product, along with the details of a particular offer associated with that specific product. The particular offer may include information about a particular channel through which the offer was offered and/or associated, as well as a specific marketing campaign of which the particular offer was a part. The table can also indicate additional parameters, such as a start and/or end date for the offer (e.g., a range of validity), and other product details, such as specific models of the product, or various incentives, rates, and product details associated with the offer. In some instances, the product offer may further be associated with particular requirements, where those requirements can be used to at least initially evaluate whether particular users qualify for the offer, such as credit ratings, membership requirements, reward tiers or levels, and others. In some instances, each offer may also be associated with a type or description which provides information about the offer, where such information can be used by a human to easily understand a summary of the product and the associated offer.

At 404, in response to receiving the URL and its parameters, a validation is performed on the acquisition ID associated with or included within the URL. To perform the validation, the acquisition ID associated with the URL can be compared against a database of existing acquisition IDs (e.g., the acquisition ID database 126 of FIG. 1). Based on the comparison, it can be determined whether acquisition ID associated with the URL corresponds to a valid acquisition ID, and therefore a valid product offer. For example, an acquisition ID may have expired or may not longer be valid after a period of time. If a customer clicks on or uses a hyperlink or address associated with the received URL (e.g., from an online advertisement, a previously-received email, via manual entry, etc.), the offer for the product may in some cases no longer be available for use, and cannot be validated. In another example, the acquisition ID may be completely invalid (e.g., may never have existed), and may result in an error or other notification to the customer.

At 406, if the first product offer is determined to be invalid, method 400 proceeds to 424, where a determination is made as to whether the acquisition ID exists. If the acquisition ID does not exist the system can return an error code at 426. For example, if a user manually inputs a URL and makes a transposition error resulting in an acquisition ID that is not associated with any product offer, the system can determine the acquisition ID does not exist and return an error indicating the URL is invalid. In an alternative example, when an acquisition ID does not exist, a security system can be alerted and the entity requesting the URL can be temporarily or permanently ignored in order to prevent denial of service attacks on the system.

Returning to 424, if the acquisition ID is determine to exist, but is also determined to be expired, a search is performed based on the parameters associated with the acquisition ID (and the first product offer) at 428. For example, if the first product offer was a cashback offer but the offer has currently expired because the link is old, the search can return all active cashback offers or other product offers that may be similar to the first product offer. In some implementations, the search may be filtered or sorted based on additional available information. For example, the search results may be prioritized based on profitability, conversion rates of offers, or offers that were accepted by customers with similar customer details, among other filtering criteria.

At 430, a second product offer, selected based on and from the search results (identified after 428), is provided for presentation to the customer, who can accept or decline the second product offer. In some implementations, multiple alternative product offers can be provided for presentation to the customer, and the customer can select one. If the customer accepts the second product offer, the system can sell the second product to the customer in a method similar to, or different from, method 400 at 408 through 422.

Returning to 406, in response to a determination that the acquisition ID and first product offer are valid, method 400 proceeds to 408. At 408, a digital application associated with the product offer is generated. The digital application can be a form including a plurality of fields that a customer can use to input data required to complete the transaction. For example, the digital application can require a name, date of birth, address, and phone number. In some implementations, the digital application can be pre-filled or partially filled by the system based on information the customer has already provided. In some implementation, the digital application may simply be a checkout form requiring a minimum amount of information to complete a transaction.

At 410, the digital application is provided for presentation to the customer. The digital application can be presented by a software application, such as the client application 186 as described with reference to FIG. 1, or other application. The digital application can be presented in a GUI, similar to or different from GUI 184 as discussed with reference to FIG. 1. Once presented the customer can complete the digital application, inputting required information for to complete the transaction or finalize the product offer.

At 412, the completed digital application is received and can be analyzed. An adjudication process is performed at 414 to determine whether the customer meets requirements associated with the product offer. In some instances, such as those related to financial products, the adjudication process can be a creditworthiness analysis, where the analysis may be based on one or more credit rules defined by the financial institution, which can be used to determine whether the digital application is to be accepted or rejected, as well as an amount associated with the acceptance, where appropriate. The adjudication inputs can be taken from one or more databases and credit bureaus as well as the digital application when making a determination, and, in some cases, can provide an instantaneous or near-instantaneous decision regarding the digital application. In some examples, the adjudication process may relate to attempting to authorize the transaction based on an account of the customer. As described with reference to operation 228 of FIG. 2, the authorization can be conducted in various different manners.

If, at 416, the digital application is rejected based on an unfavorable adjudication, the transaction will not be completed 434, and a corresponding notification can be provided. In response to a positive determination at 416 approving the digital application, a new customer account can be created at 418.

At 418, a new customer account is created for the customer. The new customer account can include a unique identifier or account number as well as some or all of the information associated with the customer received from the digital application, which can be stored in the account data with the acquisition ID associated with the product offer that was accepted. In some instances, the account can be associated with an existing customer of the financial institution or organization, and the new account can be linked or associated with the other previously-existing accounts.

At 420, the product can optionally be provided to the customer. The product can be provided to the customer based on the product offer. For example, if the customer opened a new credit account, an account can be generated for the customer, and the customer can be provided with an account number or other information necessary to access and use the account. In another example, if the product is a physical object, it can be shipped to an address associated with the customer, and the customer can be notified that a shipping order has been created. In yet another example the customer can be provided with a pick-up location, where they can provide an identification and collect their product.

At 422, the acquisition ID is stored with the newly created account associated with the product offer. In this manner the account will contain information about which product was sold, and under what marketing campaign and incentives. Information about the newly created account and the acquisition ID can also be stored in a separate repository for long term storage and analysis.

At 432, analytics are performed on the stored data in the repository. The analytics can be a machine learning process that can determine optimal campaigns based on past marketing strategies (e.g., cashback offers are more successful in spring, whereas bonus points offers perform better during the fall, etc.). the separate repository historical data with a high level of detail. Since each customer account can be stored with the acquisition ID that was used in opening the account, the successful marketing campaign and particular offer (including channel the offer was made through) can be determined for each account. The determined information can then be used on a broad scale, considering many customer accounts, in order to derive insights and improve future marketing campaigns.

Figure 5:
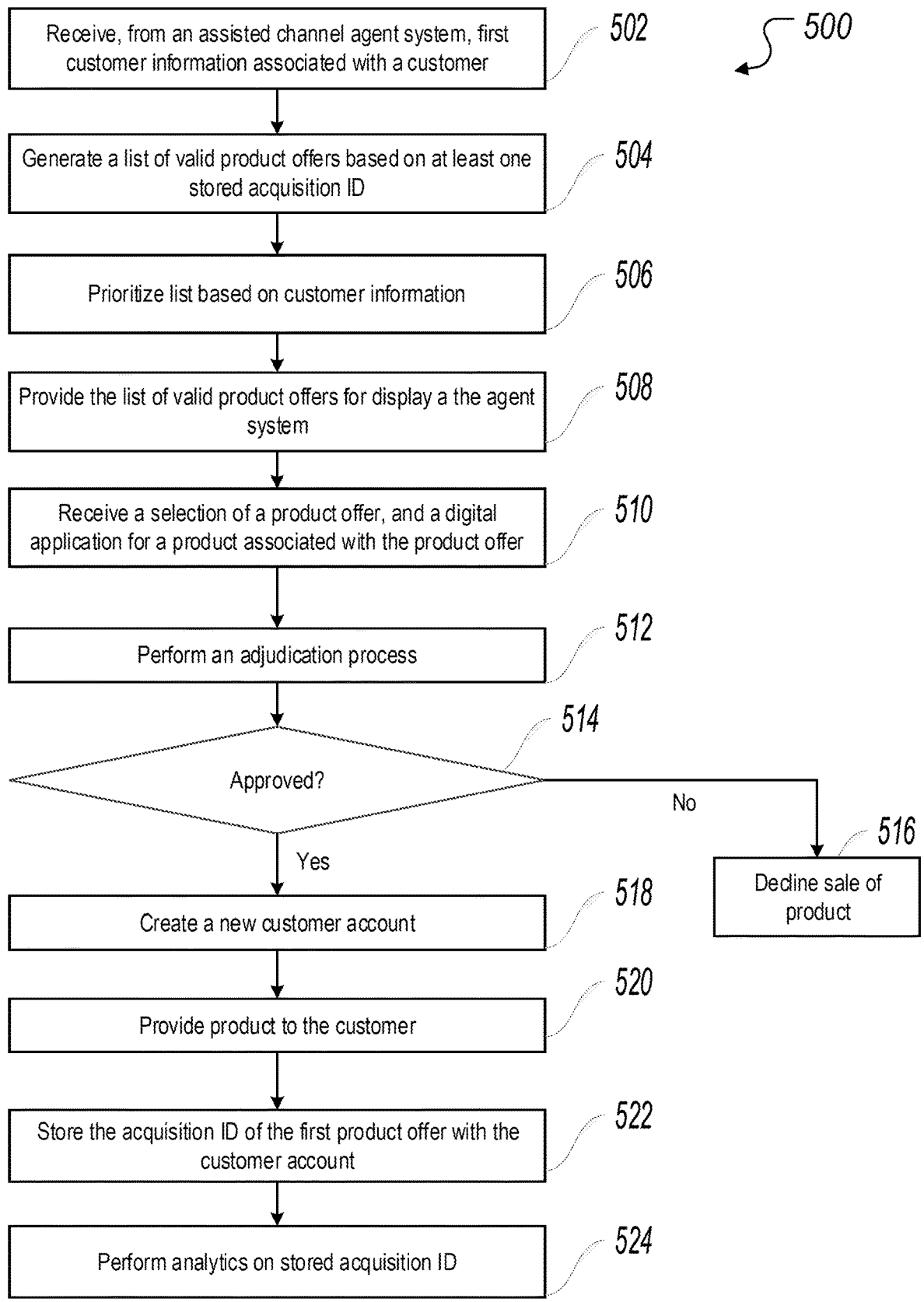
FIG. 5 is a flowchart describing an example method for tracking product offers and their performance in an assisted channel.

FIG. 5 is a flow diagram of an example method 500 for tracking product offers in an assisted channel. FIG. 5 is illustrated from the point of view of a financial institution, such as FI system 102 of FIG. 1. However, it will be understood that method 500 may be performed, for example, by any other suitable system, environment, software, and hardware, or a combination of systems, environments, software, and hardware as appropriate. In some instances, method 500 may be performed by a plurality of connected components or systems. Any suitable system(s), architecture(s), or application(s) can be used to perform the illustrated operations.

At 502, customer information associated with a customer is received from an assisted channel agent system. The agent system can be similar to, or different from, the agent system 150 as described with reference to FIG. 1. For example, an agent using a customer assistance telephone line may collect information about a customer who has expressed interest in a product offer. While or after receiving that information, the agent can input that information into the agent system. In some implementations, the customer information can be basic information, for example, name and surname. In other implementations, the customer information can include more detailed information (e.g., birthdate, address, telephone number, etc.). In some implementations, the customer information can also include address or a partial or complete social security number, as well as other identification information. The customer information can additionally include details regarding a particular product, or type of product, the customer is interested in as well as a benefit or incentive the customer desires. For example, if the product is a financial product, the customer information can include an indication that the customer desires a particular financial incentive (e.g., 0% interest rate, sign-on bonus, bonus travel points, etc.). The agent can collect the customer information from the customer verbally, by accessing information via the agent system associated with one or more accounts, or by any other method.

At 504, a list of valid product offers is generated based on at least one acquisition ID stored in a repository. For example, a database of acquisition IDs can be queried, returning all that are currently valid. The database of acquisition IDs can be similar to, or different from acquisition ID database 126 as described with reference to FIG. 1. The list of valid product offers can be further filtered based on the customer information. For example, the list can initially return all active acquisition IDs (or product offers) that a financial institution offers and that are currently available. In this example, the customer's date of birth may disqualify them from one or more offers that are valid, but only applicable to customers in a specified age range. In this example, the list can be further filtered to include only offers that are active, as well as applicable to the customer based on the customer's indicated desire. For example, if the customer indicates they are interested in a cash back offer, the list of valid product offers can be filtered to include only active offers for cash back products.

At 506, the list can be prioritized. For example, a financial institution may conduct a profitability analysis on each offer and prioritize offers with a higher profitability. In another example, an expected success rate, such as a conversion rate, or related metric, can be determined based on previously conducted market analytics (as described above) and the list can be prioritized based on the expected success rate. The prioritized list can also include additional information to assist the agent. For example, there can be details presented about each product indicating the products' incentives (e.g., that the product is a limited time offer, that it is the lowest rate ever offered, etc.).

At 508, the prioritized list is provided to the agent system for display to the agent. The agent system can display this list in a GUI associated with a web page or application, in a manner that allows the agent to easily recommend and/or select one or more product offers that may be most likely to satisfy the customer. The customer can then accept one of the particular product offers, or identify a particular offer as preferred. The agent using the agent system can then complete a digital application on behalf of the customer associated with the particular offer selected, and the digital application can then be transmitted back to the FI system for consideration.

At 510, the selection of the completed digital application for a particular product associated with a particular product offer is received. The digital application can include any additional information required to open an account or otherwise complete the transaction and account creation. For example, the digital application can include detailed information about the customer such as current address, previous addresses, income information, social security information, spouse or dependent information, bank account information, or other information used to consider the digital application.

At 512, an adjudication processes is performed. The adjudication process can be completed by an adjudication engine which can be similar to or different than the adjudication engine 118 as discussed with reference to FIG. 1. The adjudication can be a creditworthiness analysis based on one or more credit rules defined by the financial institution, which can be used to determine whether the digital application is to be accepted or rejected, as well as an amount associated with the acceptance, where appropriate. The adjudication process can use one or more databases and credit bureaus when making its determination and, in some cases, can provide an instantaneous or near-instantaneous decision regarding the digital application. In some instances, the adjudication process, or a portion thereof, may be completed by a credit management system offered by TSYS or another vendor. As described with reference to operation 228 of FIG. 2, the authorization can be conducted in various different manners.

At 514, the adjudication process is completed and a determination of whether the digital application is approved is performed. If the digital application is not approved, method 500 proceeds to 516, and the transaction is declined. In some implementations, at 516, the customer can be offered a different, lower risk product instead of the declined offer for the initial product offer. Returning to 514, if the digital application is approved method 500 proceeds to 518.

At 518, a new customer account is created and associated with the customer. The new customer account can include a unique identifier or account number as well as some or all of the information associated with the customer received from the digital application, which can be stored in the account data with the acquisition ID associated with the product offer that was accepted.

At 520, the product can optionally be provided to the customer. The product can be provided to the customer based on the product offer. For example, if the customer opened a new credit account, an account can be generated for the customer, and the customer can be provided with an account number or other information necessary to access and use the account. In another example, if the product is a physical object, it can be shipped to an address associated with the customer, and the customer can be notified that a shipping order has been created. In yet another example, the customer can be provided with a pick-up location, where they can provide identification and collect their product. In some implementations, the FI system can transmit an authorization to an agent system to inform the agent that they may provide the product to the customer, or that the product offer has been completed and the product has been redeemed by the customer.

At 522, the acquisition ID is stored with the newly created account associated with the product offer. In this manner the account will contain information about which product was sold and under what marketing campaign and incentives. Information about the newly created account and the acquisition ID can also be stored in a separate repository for long term storage and analysis.

At 524, analytics can be performed on the stored acquisition IDs. The analytics can be similar to the analytics performed with reference to FIG. 4, element 432.

The preceding figures and accompanying description illustrate example processes and computer-implementable techniques. However, system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, the described systems and flows may use processes and/or components with or performing additional operations, fewer operations, and/or different operations, so long as the methods and systems remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

The invention claimed is:

1. A system comprising:
a communications module;
at least one memory storing instructions, a repository storing a plurality of product offers, wherein each product offer is associated with at least one acquisition identification (ID), wherein each acquisition ID identifies information associated with the respective product offer including a particular offer for the product, a platform on which the product is offered, and a range of offer validity dates, and a repository storing a plurality of user accounts, wherein each user account associated with a particular customer;
at least one hardware processor interoperably coupled with the at least one memory and the communications module, wherein the instructions instruct the at least one hardware processor to:
receive, from an assisted channel agent system and via an application programming interface (API), customer information associated with a customer;
generate a list of valid product offers based on at least one stored acquisition ID;
generate, for each valid product offer, a universal resource locator (URL) that is uniquely associated with a particular acquisition ID and corresponds to a set of parameters associated with the particular valid product offer;
provide, using the API, the list of valid product offers for display at the assisted channel agent system;
receive, from the assisted channel agent system, a navigation request associated with a particular URL of the particular valid product offer and a digital application for a product associated with the product offer, the navigation request indicating a selection of a product offer;
perform an adjudication process based on the digital application, and the set of parameters;
in response to an approval during the adjudication process:
create a new customer account associated with the customer; and
store the acquisition ID associated with the product offer with the account associated with the customer, wherein the stored acquisition ID is one of a plurality of stored acquisition IDs.

2. The system of claim 1, wherein the assisted channel agent system is operated by an agent, wherein the agent is a user that is different than the customer, wherein a valid product offer is an offer that is available to the customer based on the customer information, and wherein the product is a financial product associated with a particular incentive.

3. The system of claim 2, wherein the financial product is a credit card, and wherein the particular incentive is at least one of:
an incentive interest rate;
bonus points that are redeemable by the customer for rewards; or
cash-back.

4. The system of claim 1, wherein the instructions instruct the at least one processor to:
perform analytics on the product offers based on the plurality of stored acquisition IDs;
generate an updated product offer, the updated product offer based on the analytics;
generate and store at least one new acquisition ID based on the updated product offer.

5. The system of claim 4, wherein the provided list of valid offers is prioritized based on at least one of:
a profitability determination; or
a determination of likelihood of success based on the customer information and the performed analytics.

6. The system of claim 5, wherein the determined likelihood of success is based at least in part on the customer information including customer demographics.

7. The system of claim 1, wherein the provided list of valid offers includes information for each offer identifying benefits of that particular offer.

8. The system of claim 1, wherein the acquisition ID further identifies at least one of:
an interest rate associated with the product;
an incentive associated with the product;
a cost associated with the product; or
a marketing category associated with the product offer.

9. The system of claim 1, wherein the instructions instruct the at least one processor to, prior to receiving the customer information:
receive a set of parameters, the set of parameters associated with the product offer;
generate and store at least one acquisition ID based on the set of parameters.

10. A non-transitory, computer-readable medium storing computer-readable instructions executable by a computer and configured to:
receive, from an assisted channel agent system and via an application programming interface (API), customer information associated with a customer;
generate a list of valid product offers based on at least one stored acquisition ID, wherein the at least one stored acquisition ID identifies information associated with the respective product offer including a particular offer for the product, a platform on which the product is offered, and a range of offer validity dates;
generate, for each valid product offer, a universal resource locator (URL) that is uniquely associated with a particular acquisition ID and corresponds to a set of parameters associated with the particular valid product offer;

provide, using the API, the list of valid product offers for display at the assisted channel agent system;

receive, from the assisted channel agent system, a navigation request associated with a particular URL of the particular valid product offer, the navigation request indicating a selection of a product offer and a digital application for a product associated with the product offer;

perform an adjudication process based on the digital application, and the set of parameters;

in response to an approval during the adjudication process:

create a new customer account associated with the customer; and store the acquisition ID associated with the product offer with the account associated with the customer, wherein the stored acquisition ID is one of a plurality of stored acquisition IDs.

11. The non-transitory, computer-readable medium of claim 10, wherein the assisted channel agent system is operated by an agent, wherein the agent is a user that is different than the customer, wherein a valid product offer is an offer that is available to the customer based on the customer information, and wherein the product is a financial product associated with a particular incentive.

12. The non-transitory, computer-readable medium of claim 11, wherein the financial product is a credit card, and wherein the particular incentive is at least one of:

an incentive interest rate;

bonus points that are redeemable by the customer for rewards; or cash-back.

13. The non-transitory, computer-readable medium of claim 10, wherein the instructions are configured to:

perform analytics on the product offers based on the plurality of stored acquisition IDs;

generate an updated product offer, the updated product offer based on the analytics;

generate and store at least one new acquisition ID based on the updated product offer.

14. The non-transitory, computer-readable medium of claim 13, wherein the provided list of valid offers is prioritized based on at least one of:

a profitability determination; or a determination of likelihood of success based on the customer information and the performed analytics.

15. The non-transitory, computer-readable medium of claim 14, wherein the determined likelihood of success is based at least in part on the customer information including customer demographics.

16. The non-transitory, computer-readable medium of claim 10, wherein the provided list of valid offers includes information for each offer identifying benefits of that particular offer.

17. A computerized method performed by one or more processors, the method comprising:

receiving, from an assisted channel agent system and via an application programming interface (API), customer information associated with a customer;

generating a list of valid product offers based on at least one stored acquisition ID, wherein the at least one stored acquisition ID identifies information associated with the respective product offer including a particular offer for the product, a platform on which the product is offered, and a range of offer validity dates;

generating, for each valid product offer, a universal resource locator (URL) that is uniquely associated with a particular acquisition ID and corresponds to a set of parameters associated with the particular valid product offer;

providing, using the API, the list of valid product offers for display at the assisted channel agent system;

receiving, from the assisted channel agent system, a navigation request associated with a particular URL of the particular valid product offer, the navigation request indicating a selection of a product offer and a digital application for a product associated with the product offer;

performing an adjudication process based on the digital application, and the set of parameters;

in response to an approval during the adjudication process:

creating a new customer account associated with the customer; and storing the acquisition ID associated with the product offer with the account associated with the customer, wherein the stored acquisition ID is one of a plurality of stored acquisition IDs.

18. The method of claim 17, wherein the assisted channel agent system is operated by an agent, wherein the agent is a user that is different than the customer, wherein a valid product offer is an offer that is available to the customer based on the customer information, and wherein the product is a financial product associated with a particular incentive.

19. The method of claim 17, comprising:

performing analytics on the product offers based on the plurality of stored acquisition IDs;

generating an updated product offer, the updated product offer based on the analytics;

generating and store at least one new acquisition ID based on the updated product offer.

20. The method of claim 19, wherein the provided list of valid offers is prioritized based on at least one of:

a profitability determination; or a determination of likelihood of success based on the customer information and the performed analytics.

* * * * *